(12) United States Patent
Paff et al.

(10) Patent No.: US 7,493,429 B2
(45) Date of Patent: Feb. 17, 2009

(54) COMMUNICATION OF INFORMATION VIA A SIDE-BAND CHANNEL, AND USE OF SAME TO VERIFY POSITIONAL RELATIONSHIP

(75) Inventors: John E. Paff, Sammamish, WA (US); Marcus Peinado, Bellevue, WA (US); Thekkthalackal Varugis Kurien, Sammamish, WA (US); Bryan Mark Willman, Kirkland, WA (US); Paul England, Bellevue, WA (US); Andrew John Thornton, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 802 days.

(21) Appl. No.: 10/759,325

(22) Filed: Jan. 16, 2004

(65) Prior Publication Data

US 2005/0010818 A1    Jan. 13, 2005

Related U.S. Application Data

(60) Provisional application No. 60/485,499, filed on Jul. 8, 2003.

(51) Int. Cl.
*G06F 13/12* (2006.01)
*G06F 13/38* (2006.01)

(52) U.S. Cl. .............................. 710/62; 380/44; 380/45; 380/46; 380/47; 380/278; 380/279; 380/280; 380/281; 380/282; 380/283; 380/284; 380/285; 380/286

(58) Field of Classification Search .................... 710/62; 380/44, 45, 46, 47, 278, 280, 281, 282, 283, 380/284, 285, 286
See application file for complete search history.

(56) References Cited

U.S. PATENT DOCUMENTS

| 5,311,596 A * | 5/1994 | Scott et al. ..................... 380/33 |
| 5,396,602 A | 3/1995 | Amini et al. ................. 710/113 |
| 5,450,551 A | 9/1995 | Amini et al. ................. 710/119 |
| 5,675,740 A | 10/1997 | Heimsoth et al. ........... 709/228 |
| 5,930,368 A * | 7/1999 | Hocker et al. .................. 380/52 |
| 6,032,238 A | 2/2000 | Green, III et al. ........... 711/170 |
| 6,182,168 B1 | 1/2001 | Guthrie ....................... 710/52 |
| 7,065,597 B2 * | 6/2006 | Kumar et al. ............... 710/260 |
| 7,081,806 B2 * | 7/2006 | Koike .......................... 340/5.6 |
| 2004/0184615 A1 * | 9/2004 | Elliott et al. ................. 380/283 |

OTHER PUBLICATIONS

"Tom's Hardware: Building Your Own PC" http://www.tomshardware.com/reviews/building-pc,511.html, Sep. 4, 2002, pp. 1-22.*

* cited by examiner

*Primary Examiner*—Alford W Kindred
*Assistant Examiner*—Chun-Kuan Lee
(74) *Attorney, Agent, or Firm*—Woodcock Washburn LLP

(57) ABSTRACT

The present invention provides for trusted side-band communications between components in a computer system, so that use of the system bus may be avoided. Two components may be connected by means other than a bus (e.g., an infrared port, a wire, an unused pin, etc.), whereby these components may communicate without the use of the system bus. The non-bus communication channel may be referred to as "side-band." The side-band channel may be used to communicate information that might identify the user's hardware (e.g., a public key) or other information that the user may not want to be easily intercepted by the public at large. Communication over the side-band channel may also be used to verify that the participants in a communication are within a defined positional relationship to each other.

15 Claims, 7 Drawing Sheets

COMMUNICATION OF INFORMATION VIA A SIDE-BAND CHANNEL, AND USE OF SAME TO VERIFY POSITIONAL RELATIONSHIP

CROSS-REFERENCE TO RELATED CASES

This application claims the benefit of U.S. Provisional Application No. 60/485,499, entitled "Communication of Information via a Trusted Side-Band Channel," filed on Jul. 8, 2003.

FIELD OF THE INVENTION

The present invention relates generally to the field of computing, and, in particular, to the communication of information on a side-band channel.

BACKGROUND OF THE INVENTION

Components within a computer system are typically connected to each other using a bus. A first component communicates data to a second component by writing data to the bus. A second component then receives the data by reading the bus. Conventions exist that allow a given component to determine whether the data on the bus is destined for that component or for a different component. However, the physical architecture of many such busses is such that any component can connect to the bus, and can read the data off the bus—even if the data is not destined for that component. Thus, the bus provides an opportunity for snooping or modifying data, so the bus may not be appropriate for transmitting private data in the clear.

One context in which is it may be undesirable to place data on the bus is where the data could identify the user based on a unique hardware identifier. For reasons of privacy, many users are wary of unique hardware identifiers, and resist using hardware that employs such identifiers. However, some hardware components employ unique public/private key pairs in order to engage in encrypted communication. While identifying the user is not the primary purpose of the key pair, the public key is, in fact, substantially unique to the hardware and could be used for such an identifying purpose. Since the public key must be transmitted to the entity that will use the key to encrypt information, the transmission of the key over a bus provides an opportunity for this potentially identifying information to be divulged, and thus it is desirable to transmit the key by some means other than the bus so that the key cannot easily be intercepted.

Additionally, since the bus can be read and/or written by components that have access to the world outside of the computer of which the bus is a part (e.g., the bus can be written by network cards, that can communicate with components anywhere on the Internet), it is generally not possible to determine whether data on the bus originated from inside the computer or from a remote component. Thus, the fact that a computer is communicating with a component over the bus is generally not a very good basis to conclude that the component is located in physical proximity to the computer, since the component could be located remotely and placing data on the bus through the computer's network interface.

In view of the foregoing, there is a need for a system that overcomes the drawbacks of the prior art.

SUMMARY OF THE INVENTION

The present invention provides for side-band communication between different components of a computer system. In one example, a side-band communication channel may be used to transmit a public key, or other information, between components in the computer system without placing the information on the system bus. The side-band communication channel may be embodied, for example, through infrared ports connecting the components, through a wire, through unallocated pins, or through other means that are more particularly described below.

In a preferred embodiment, it is possible for the computer system to communicate with components through the side-band channel without the use of a bus. Thus, a component (e.g., a video adapter card, a disk controller, etc.) may be connected to a computer through the bus, and may also be connected to the computer through a side-band channel that does not pass information through the bus. Thus, the component and the computer have a means to communicate without placing any data on the bus.

In a preferred embodiment, the side-band channel is implemented by such physical means that communication over the side-band channel is only possible if the two participants in the communication are within a defined positional relationship to each other. For example, the side-band channel may be implemented by an infrared device, in which case the two participants in communication must be within a line of sight of each other, and must also be within the distance range of an infrared transmitter. As another example, the side-band channel may be implemented by a wire, in which case communication over the side-band channel requires that the participants are no further apart than the length of the wire. Thus, active communication between a computer and a component over the side-band channel can be used to verify that the component is actually located within physical proximity to the computer; if communication between the component on the computer takes place through the bus, then there is a possibility that the component is actually located remotely, and is merely reading and/or writing data on the bus through the computer's network adapter. (Such remote access to the bus leaves open the possibility that a component that appears to be communicating through the bus has been "virtualized"—i.e., that the component is not really present, but rather that the component is remotely located (or being remotely emulated) and is merely "behaving" as a real, physically-present component would behave).

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and instrumentalities disclosed. In the drawings.

DETAILED DESCRIPTION OF THE INVENTION

Overview

A side-band channel may be used to pass information between electronic components without the use of the system bus, and thus without the risk of interception by other components that is inherent in the use of a bus. Additionally, since the side-band channel may enable communication only when two components satisfy a defined positional relationship to each other, communication over the side-band channel may be used to verify a physical positional relationship between the components—thereby ensuring that the participants in the communication are physically located within a defined relationship to each other, and that neither participant has been "virtualized" (e.g., "virtualized" in the sense of participating over a remote link by placing data on the bus through a network interface).

Exemplary Computing Arrangement

Figure 1:
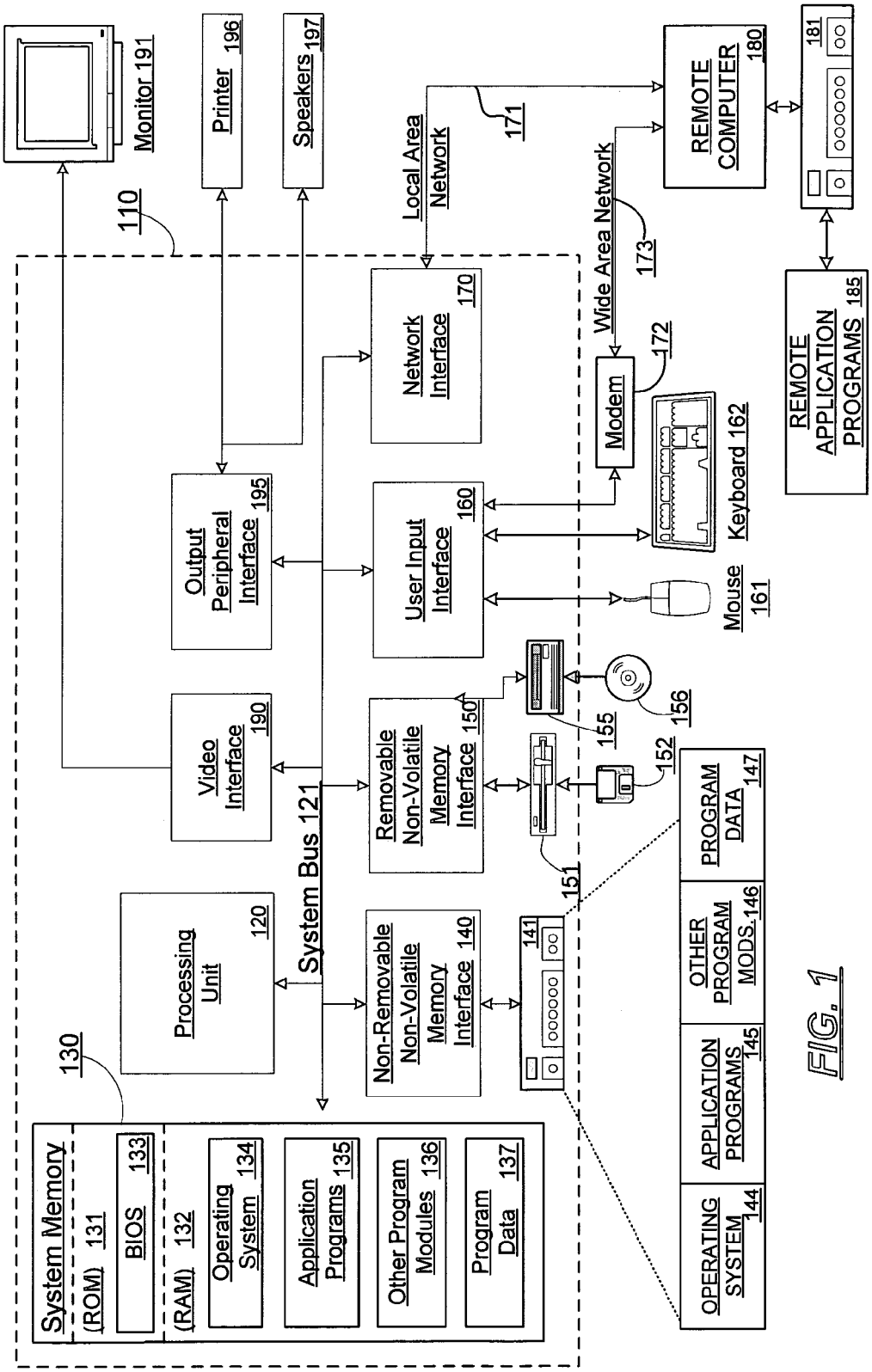
FIG. 1 is a block diagram of an example computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Communication Between Components in a Computer System

Figure 2:
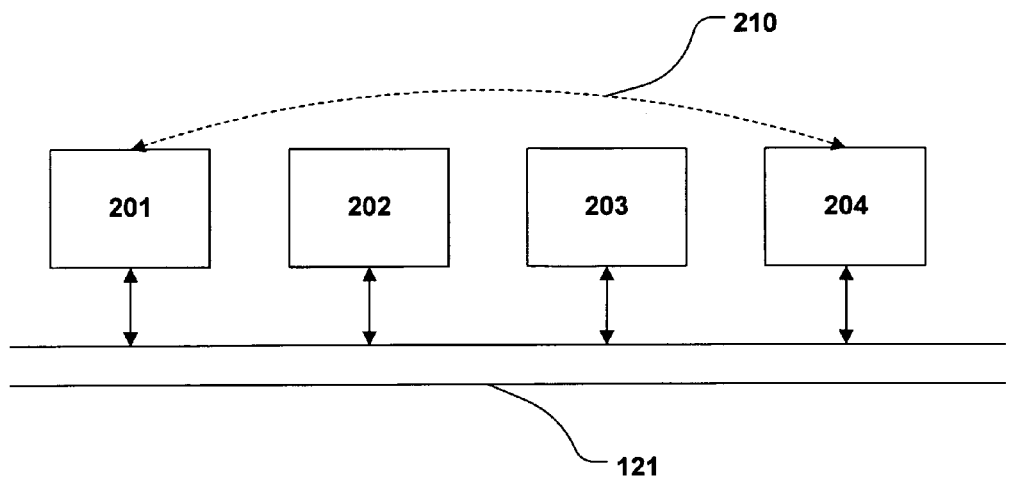
FIG. 2 is a block diagram showing a plurality of components that communicate by way of a bus, including two components that communicate by way of a side-band channel.

As discussed above in connection with FIG. 1, a computer 110 typically contains a system bus 121, through which different components of computer 110 communicate. In general, when data is to be sent from one component to another, the data is written to bus 121 by the sending component, and read from bus 121 by the receiving component. FIG. 2 shows an example of components 201, 202, 203, and 204, which are connected to bus 121, and may communicate with each other by way of bus 121. For example, component 201 may send data to component 204 by writing the data to bus 121. The data may then be read from the bus by component 204.

It will be observed in FIG. 2 that all components 201-204 have physical access to the bus—i.e., all components are physically able to read information from bus 121. While this structure theoretically allows any component to read any information from the bus, for a given type of bus a convention is established that allows a component to determine whether data on the bus is destined for that component or for another component. In effect, a component ignores any data on the bus that is not directed to that component. However, it is physically possible for a component to read data that is not intended for that component. Moreover, in an open architecture computer, a wide variety of components from a wide variety of sources can be attached to the bus; any one of these components could read the data on the bus and divulge that data (e.g., by sending the data over the Internet to some other entity). Thus, communication on the bus cannot be considered private.

In order for components to engage in private communication, they may establish a side-band communication channel 210, which allows data to travel between components without that data being placed on the bus. Specific techniques for establishing a side-band channel are discussed below in connection with FIGS. 4-5.

Example Scenario in which a Side-Band Channel may be Used

Figure 3:
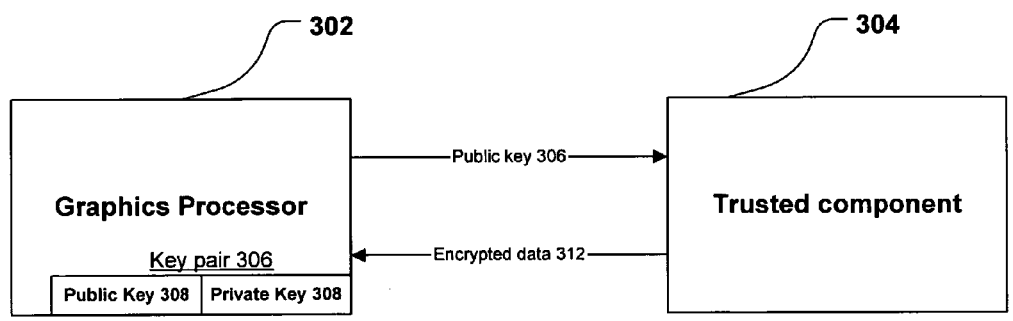
FIG. 3 is a block diagram showing communication of encrypted information between a trusted component and a graphics processor.

FIG. 3 shows an example scenario where it may be desirable to communicate information by way of a side-band channel, rather that by way of a bus. In the example of FIG. 3, trusted component 304 generates data to be communicated to graphics processor 302. The data to be communicated is typically video data to be displayed on a graphics surface (e.g., a monitor), and the nature of the information is such that arbitrary components should not be able to intercept the information. For example, trusted component may be software that handles confidential banking information, and the information being sent to graphics processor 302 may be representative of bank balances, account numbers, etc. As another example, trusted component 304 may be a rendering application that handles copyrighted video, and it may be desirable to ensure that the copyrighted video images destined for the screen cannot be intercepted by entities that might engage in unauthorized distribution of these images. There are various embodiments of trusted component 304, and the invention is not limited to any particular embodiment.

In order to ensure that information sent from trusted component 304 to graphics processor 302 cannot be intercepted, trusted component 304 encrypts the information prior to sending it. The encrypted information is then decrypted at graphics processor 302. In the example of FIG. 3, graphics processor 302 is physically associated with a public/private key pair 306. Public/private key pair 306 comprises a public key 308 and a private key 310. As is known in the art, a variety of algorithms exist that enable information to be encrypted with public key 308 such that the encrypted information is only decryptable with private key 310. In order to allow trusted component 304 to encrypt information destined for graphics processor 302, graphics processor 302 provides trusted component 304 with public key 308. Trusted component 304 is then able to send graphics processor 302 encrypted data 312.

It will be appreciated that, if every graphics processor 302 had the same key pair 306, then information encrypted with public key 308 would be vulnerable to a variety of attacks. In particular, if someone were to discover private key 310, then this key could be made widely available and no instance of graphics processor 310 would ever be able to rely on key pair 306 for secure communication. Thus, part of the security model for graphics processor 302 is that each instance of graphics processor 302 has its own key pair 306. However, since this fact implies that each user's hardware can be identified by a particular number (i.e., the public key 308 stored in that user's instance of graphics processor 302), many users feel this number constitutes an "electronic fingerprint" for the user himself and, for privacy reasons, are wary of allowing such a number to be divulged. As discussed above in connection with FIG. 2, information written to a bus can be intercepted by unintended parties, and thus it is desirable to communicate the public key by some mechanism other than the bus. FIGS. 4-9, which are discussed below, show various examples of how a side-band channel can be implemented.

Example Mechanisms for Implementing a Side-Band Channel

FIGS. 4-9 show various example mechanisms that can be used to implement a side-band channel, that can be used for communicating information such as public key 308 discussed above in connection with FIG. 3. It will be understood that the mechanisms depicted in FIGS. 4-9 are merely examples, and are not limiting of the invention.

Figure 4:
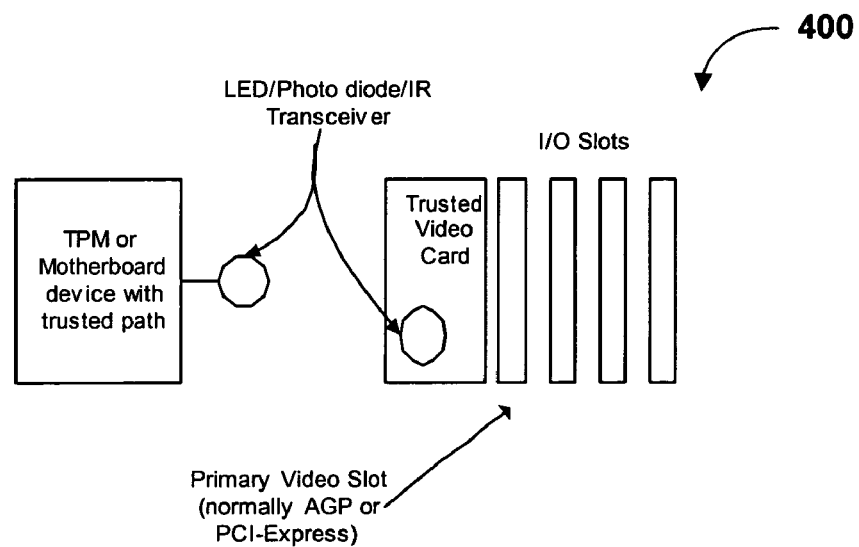
FIGS. 4-9 are block diagrams of example mechanisms for establishing a side-band communications channel.

FIG. 4 shows how a side-band channel can be created to communicate between a trusted component and a graphics processor (or "video card") using an infrared (IR) transceiver for a two-way link or via an IR LED and IR photo-diode for a one-way link. ("TPM or motherboard device with trusted path," as referred to in FIGS. 4-9, is an example of trusted component 304. In particular, TPM stands for "trusted processor module," which is a type of hardware that supports secure computing. However, it will be understood that the side-band communications mechanism of the present invention can be applied to communication between any type of components, and is not limited to the components depicted.)

Figure 5:
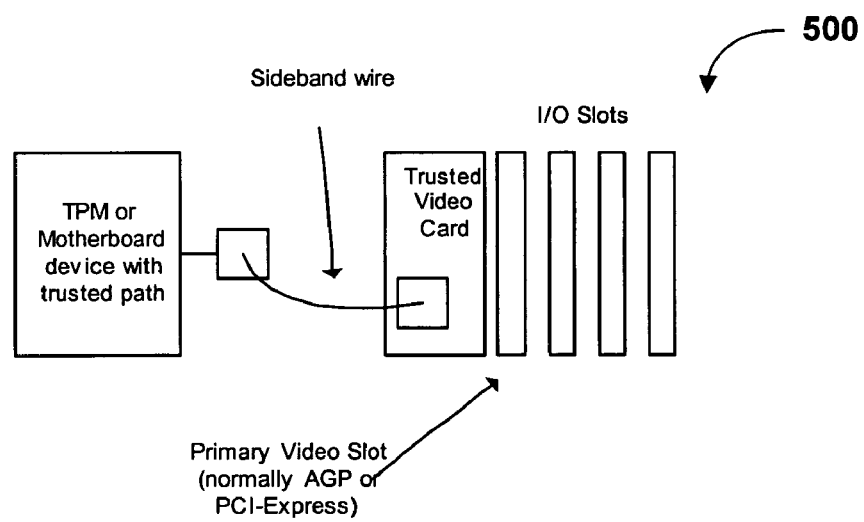

FIG. 5 shows a side-band channel (500) comprising an attachment of two devices via a physical wire (other than the system bus itself).

Figure 6:
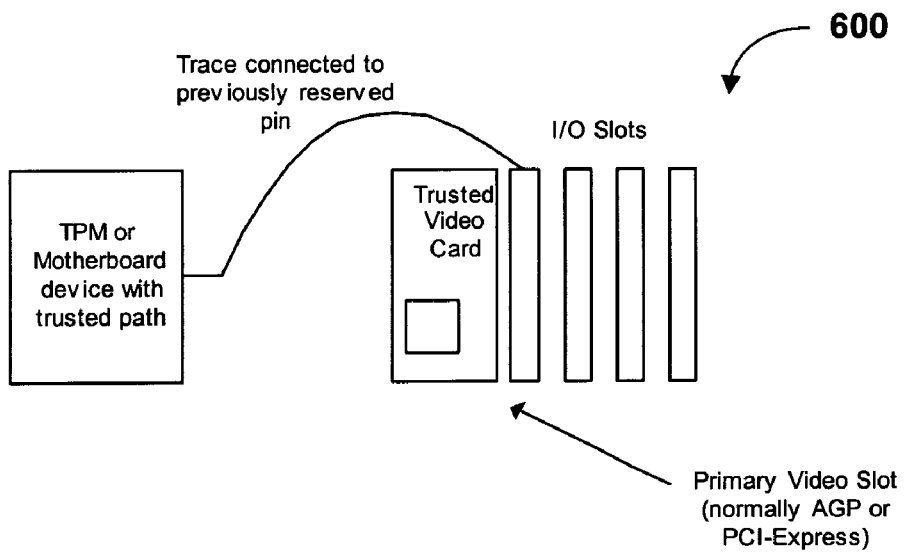

FIG. 6 shows a side-band channel (600) comprising an attachment via pins on a slot, where the pins have been allocated (or re-allocated) for the purpose of creating a side-band channel.

Figure 7:
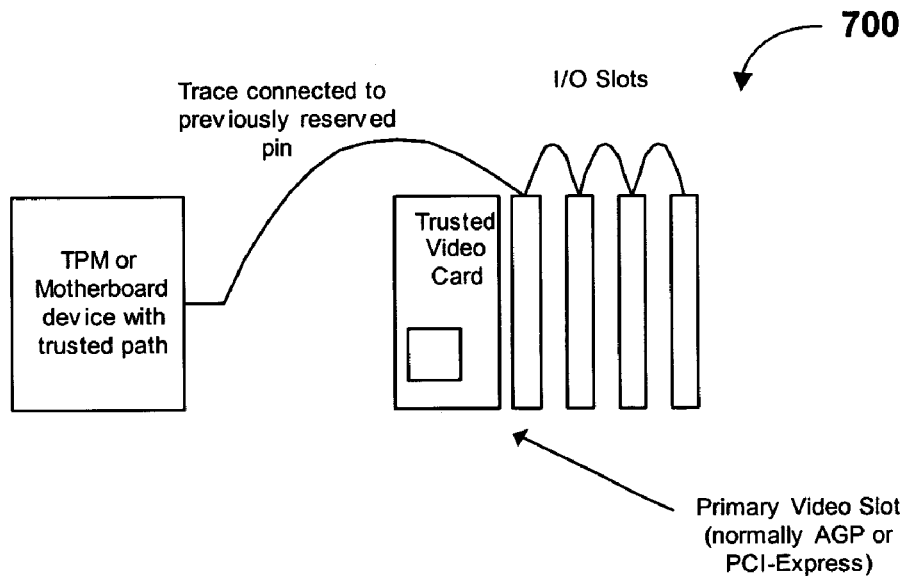

FIG. 7 shows a side-band channel (700) comprising an attachment to multiple slots via trace to support multiple trusted cards.

Figure 8:
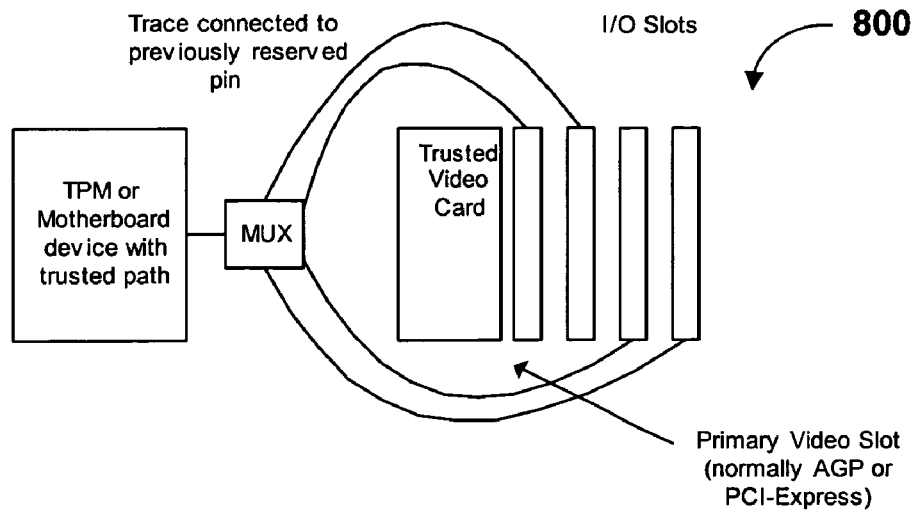

FIG. 8 shows a side-band channel (800) comprising connection via a MUX (multiplexer) to allow for only one slot to be connected at a time.

Figure 9:
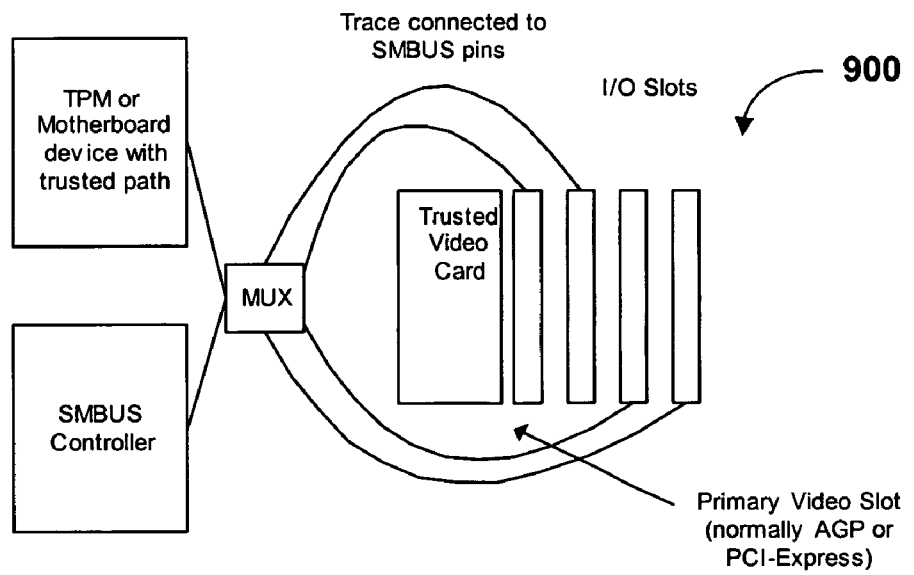

FIG. 9 shows a side-band channel (900) comprising reuse of existing SMBUS connection, isolated by a MUX. The trusted path and the SMBUS controller are inputs connected to one or all of the slots by the MUX. The MUX is controlled from the trusted path.

Example Trusted Component

As noted above, the invention provides a mechanism for communicating certain information via a side-band channel. As also noted above, one context in which such communication may be used is where a trusted component needs to acquire a key in order to encrypt information destined for a graphics processor. While the invention is not limited to any particular type of trusted component, the following is a description of a type of trusted component in which the mechanisms of the present invention may be useful.

In one example, two operating systems are run together on a single computer. The first operating system provides an ordinary, open computing environment, and the second operating system provides a "high-assurance" computing environment. The high-assurance computing environment is associated with a specification as to its functionality, and provides a very high level of assurance that it will function according to its specification—even in the face of a deliberate attack. Thus, the high-assurance environment can be trusted with valuable or sensitive information—e.g., financial records, copyrighted creative material, etc. Such a high-assurance environment may allow only certain trustworthy applications to execute within the high-assurance environment. For example, the trusted environment may allow a trusted rendering application to execute within the trusted environment, thereby giving the trusted rendering application access to certain resources of the trusted environment (e.g., cryptographic keys stored in isolated memory) that may be needed to perform certain functions (e.g., decrypting copyrighted encrypted video). The trusted rendering application may then provide the rendered video to the graphics processor, and may provide this rendered video in a way that resists interception (e.g., by encrypting the video). Thus, a trusted rendering application, or a driver through which the rendering application accesses the graphics processor, are examples of trusted component 304. It should be appreciated, however, that this example is not exhaustive, and there are numerous examples of a trusted component in accordance with the invention.

Additionally, it should be noted that a graphics processor is not the only type of component that may have a public key (or other information) to be communicated by a side-band channel. A Network Interface Card (NIC) is another example of such a component. This list of examples is non-exhaustive, and it will be appreciated that there are other examples.

Example Use of a Side-Band Channel

As discussed above, a side-band channel can be implemented by various means, such as those described in FIGS. 4-9. One feature of a side-band channel implemented according to such means is that for two participants to communicate data over the channel requires that the participants be within a specific positional relationship to each other. For example, when the side-band channel is implemented with infrared communication devices, the participants in a communication must be mutually within a line of sight, and must be within the distance over which the infrared devices can operate. When the side-band channel is implemented by a wire, the participants must be no further from each other than the length of the wire. Thus, the fact that communication is occurring between the participants effectively ensures that the participants satisfy some defined positional relationship to each other. If the nature of the communication is such that replay attacks can be ruled out (e.g., a cryptographic challenge-response protocol), communication between two participants can ensure not only that the two participants are within proximity to each other, but also of their authenticated identity. As one example, the components may be a computer and an adapter card, and the implementation of the side-band channel may be such that communication over the channel is possible only when the adapter card is mounted inside of the computer's outer case. (Of course, it is possible that the adapter card receives information from some external source and communicates that information to the computer over the side-band channel. However, it may be the case that mainstream suppliers of components will ensure that these components do not use the side-band channel in this manner. Moreover, it may be the case that the risk of a rogue user modifying the component to misuse the side-band channel is deemed a tolerable risk, since attacks that require the building and/or modification of hardware are not easily reproducible.)

Figure 10:
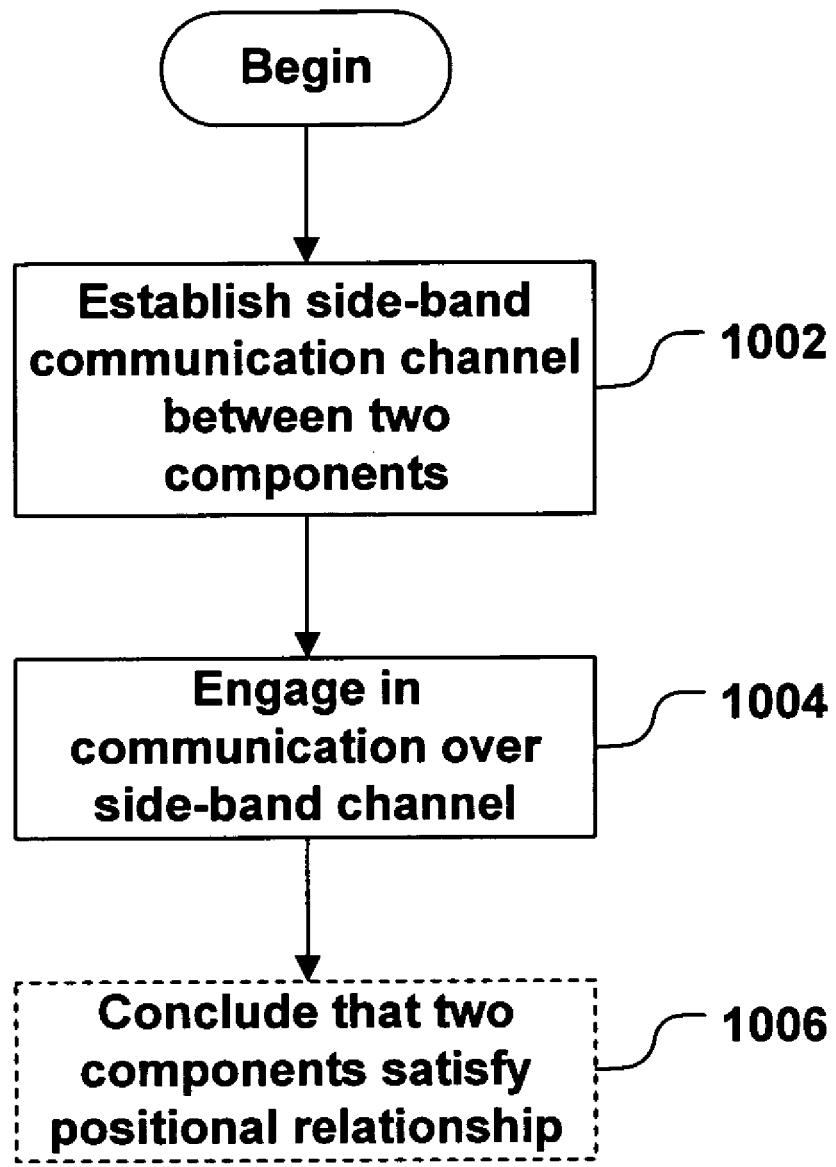
FIG. 10 is a flow diagram of an example process for engaging in side-band communication between two components.

FIG. 10 shows an example process by which two components (e.g., a computer and an adapter card) may engage in a side-band communication. The process of FIG. 10 may be used to establish that the two components satisfy a particular positional relationship. Initially, a side-band communication channel is established between the two components (1002). Following the establishment of the side-band channel, the two components engage in communication over the side-band channel (1004). Optionally, the fact that the communication has occurred over the side-band channel may result in a determination that the two communicating components are authentic and are within a defined positional relationship to each other (i.e., a relationship that meets the physical constraints of the particular embodiment of the side-band channel) (1006). For example, if the communication that takes place over the side-band channel is a challenge-response protocol, in which the computer ensures that it is engaging in live communication with an adapter card, the computer may conclude based on the fact that this challenge-response protocol has been successfully carried out over the side-band channel that an authentic adapter card is actually connected over the side-band channel and is presently communicating with the computer over such channel. Since connection to the side-band channel requires a certain positional relationship, the computer may conclude based on the successful execution of the challenge-response protocol that the positional relationship is satisfied.

Figure 11:
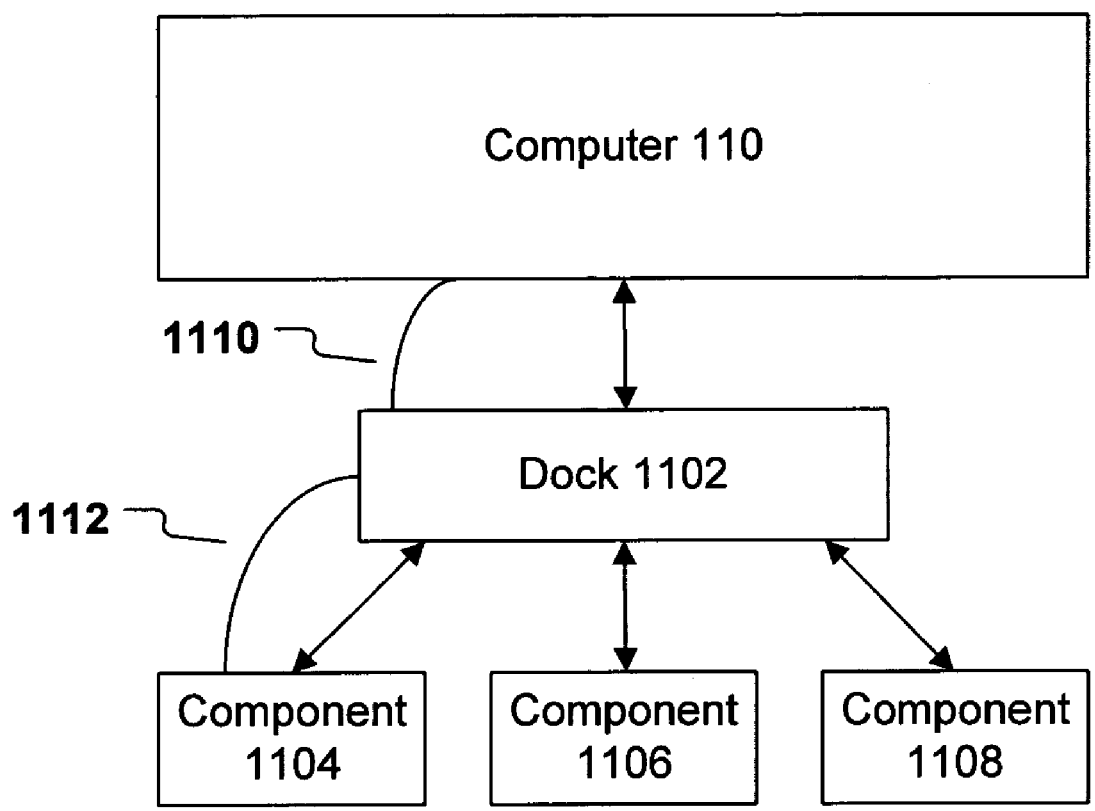
FIG. 11 is a block diagram of a dock in accordance with aspects of the invention.

As another example, the side-band channel may be used for communication with a dock. FIG. 11 shows a dock 1102 that may be used to enable components to communicate with a computer 110. For example, the dock may connect to computer 110's bus, and may augment the extensibility of computer 110 by providing additional ports for the bus. Thus, dock 1102 may occupy one port on the bus, but may provide three ports for components 1104, 1106, and 1108 to plug into. When such a dock is used, the problems described above—i.e., passing information to the computer without use of the bus, and verifying a positional relationship—may arise with respect to components that are connected through the dock. Thus, the dock may also employ one or more side-band channels. For example, dock 1102 may be communicatively connected to computer 110 through side-band channel 1110, and component 1104 may be communicatively connected to dock 1102 through side-band channel 1112. Thus, component 1104 may pass information (e.g., cryptographic keys, responses to challenge-response protocols, etc.) to dock 1102 through side-band channel 1112, and dock 1102 may pass information to computer 110 through side-band channel 1110. In this scenario, information may be passed from component, to dock, to computer, without the use of a bus.

Additionally, the positional relationship of both a component and a dock may be verified—e.g., dock 1102 may use communication over side-band channel 1110 to prove to computer 110 that dock 1102 is located in proximity to computer 110, and component 1104 may use communication over side-band channel 1112 to prove to dock 1102 that it is located in proximity to dock 1102. As long as computer 110 trusts dock 1102 to verify the positional relationship of components that are plugged into dock 1102, and as long as computer 110 has verified that dock 1102 satisfies a particular positional relationship, then computer 110 can trust that component 1104 is within an acceptable positional relationship by virtue of being plugged into dock 1102.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method of communicating between a first component and a second component located inside a computer enclosure, the method comprising:
   establishing a first communication connection between the first component and the second component inside the computer enclosure through a bus that is accessible to components other than the first component and the second component;
   establishing a light-based communication connection between the first component and the second component inside the computer enclosure in order to ensure a defined positional relationship between the first and second components, wherein the light-based communication connection does not transmit information through the bus and is not accessible to the components other than the first component and the second component; and
   transmitting a datum between the first component and the second component using said light-based communication connection.

2. The method of claim 1, wherein the second component is associated with an identifier of the second component, and said datum comprises said identifier.

3. The method of claim 2, wherein said identifier comprises a cryptographic key associated with the second component.

4. A method of communicating between a first component and a second component as defined in claim 1, wherein the light-based communication connection comprises an infrared communication connection.

5. A system comprising:
   a first component and a second component located inside a computer enclosure;
   the second component communicatively connected to said first component through a first communication channel that includes a bus inside the computer enclosure, said bus being accessible to components other than said first component and said second component; and
   a second communication channel that communicatively connects said first component with said second component using light-based communications inside the computer enclosure, said second communication channel enabling the transmission of a datum in at least one direction between said first component and said second component without exposing said datum to said bus and to the components other than the first component and the second component, and ensuring a defined positional relationship between the first and second components, wherein the first component comprises an electronic device mounted on a computer motherboard, and the second component comprises a plug-in board that plugs into an I/O slot located on the computer motherboard, and wherein the second light based communication channel enables transmission of said datum between said first component and said second component only when said second component is plugged into the I/O slot thereby establishing a defined positional orientation between the first and second components.

6. The system of claim 5, wherein said second component is associated with an identifier, and wherein said datum comprises said identifier, said datum being transmitted from said second component to said first component over said second communication channel.

7. The system of claim 6, wherein said identifier comprises a cryptographic key associated with said second component, said cryptographic key being used to encrypt data that said first component sends to said second component.

8. The system of claim 5, wherein said first component and said second component engage in communication according to a protocol over said second light-based communication channel to establish respective identities and current presence of said first component and said second component and to establish that said first component and said second component are within a level of proximity to each other.

9. A system as defined in claim 5, wherein the second communication connection comprises an infrared communication connection.

10. A computer-readable storage medium encoded with computer-executable instructions to perform a method of verifying that a first component is within a first positional relationship to a second component, the first and second components located inside a computer enclosure, the method comprising:

establishing a primary communication channel between the first component and the second component inside the computer enclosure through a bus that is accessible to components other than the first component and the second component;

sending a first datum from the first component to the second component;

receiving a second datum at the first component from the second component, the second datum being communicated from the second component to the first component through a light-based secondary communication channel inside the computer enclosure and without use of the bus, wherein the second datum is not accessible to components other than the first component and the second component;

determining that the second component satisfies the first position relationship based on receipt of the second datum.

11. The computer-readable storage medium of claim 10, wherein said first datum comprises a cryptographic key associated with the first component.

12. The computer-readable storage medium of claim 10, wherein the first positional relationship comprises the first component and the second component being within a level of proximity to each other.

13. The computer-readable storage medium of claim 10, wherein the first component comprises a computing device enclosed by a case, and wherein the first positional relationship comprises said second component being located within said case.

14. The computer-readable storage medium of claim 10, wherein said sending act and said receiving act together comprises a challenge-response protocol, and wherein the method further comprises:

determining, based on said sending act and said receiving act that the second component is engaging in a live communication with the first component over said communication channel and that the second component is not being emulated through a replay attack.

15. A computer readable storage medium as defined in claim 10, wherein the light-based secondary communication channel comprise an infrared communication connection.

* * * * *